US005668189A

United States Patent [19]

Farkas

[11] Patent Number: 5,668,189
[45] Date of Patent: Sep. 16, 1997

[54] FOAMED POLYMER AND PROCESS FOR PRODUCTION THEREOF

[75] Inventor: Paul V. Farkas, Willowdale, Canada

[73] Assignee: Woodbridge Foam Corporation, Mississauga, Canada

[21] Appl. No.: 380,627

[22] Filed: Jan. 30, 1995

Related U.S. Application Data

[60] Division of Ser. No. 74,966, Jun. 11, 1993, Pat. No. 5,432,204, which is a continuation-in-part of Ser. No. 7,991, Jan. 22, 1993, abandoned.

[51] Int. Cl.$^6$ ..................................................... C08G 18/00
[52] U.S. Cl. ........................ 521/137; 521/49; 521/99; 521/155; 428/903.3
[58] Field of Search .................... 521/49, 99, 137, 521/155

[56] References Cited

U.S. PATENT DOCUMENTS

| | | | |
|---|---|---|---|
| 3,114,722 | 12/1963 | Einhorn et al. | 521/99 |
| 3,136,731 | 6/1964 | Piechota et al. | 260/2.5 |
| 3,538,020 | 11/1970 | Heskett et al. | 210/2.5 |
| 3,801,421 | 4/1974 | Allen et al. | 161/67 |
| 4,105,594 | 8/1978 | Dieterich et al. | 521/100 |
| 4,124,518 | 11/1978 | Stone et al. | 252/91 |
| 4,193,887 | 3/1980 | Stone et al. | 252/91 |
| 4,197,372 | 4/1980 | Hostettler | 521/109 |
| 4,226,944 | 10/1980 | Stone et al. | 521/76 |
| 4,293,470 | 10/1981 | Cuscurida | 260/45.9 R |
| 4,320,208 | 3/1982 | Reischl et al. | 521/102 |
| 4,385,131 | 5/1983 | Fracalossi et al. | 521/55 |
| 4,438,221 | 3/1984 | Fracalossi et al. | 521/55 |
| 4,452,920 | 6/1984 | Joubert | 521/109.1 |
| 4,507,410 | 3/1985 | Falardeau et al. | 523/211 |
| 4,515,646 | 5/1985 | Walker et al. | 156/78 |
| 4,518,778 | 5/1985 | Cuscurida | 544/398 |
| 4,576,718 | 3/1986 | Reischl et al. | 210/616 |
| 4,596,725 | 6/1986 | Kluth et al. | 427/385.5 |
| 4,619,948 | 10/1986 | Kennedy et al. | 521/52 |
| 4,695,619 | 9/1987 | Hamermesh et al. | 528/73 |
| 4,734,439 | 3/1988 | Reischl | 521/54 |
| 4,760,099 | 6/1988 | Canaday et al. | 521/110 |
| 4,795,763 | 1/1989 | Gluck et al. | 521/99 |
| 4,801,621 | 1/1989 | Reischl | 521/53 |
| 4,843,105 | 6/1989 | Reischl et al. | 521/54 |
| 4,876,291 | 10/1989 | Dallavia, Jr. et al. | 521/124 |
| 4,916,173 | 4/1990 | Otloski et al. | 523/219 |
| 5,034,222 | 7/1991 | Kellett et al. | 424/76.4 |
| 5,055,339 | 10/1991 | Eder et al. | 428/157 |
| 5,079,276 | 1/1992 | Kumasaka et al. | 521/170 |
| 5,177,117 | 1/1993 | Coe et al. | 521/117 |
| 5,254,405 | 10/1993 | Panaroni et al. | 521/507 |
| 5,385,953 | 1/1995 | McClellan | 521/128 |

FOREIGN PATENT DOCUMENTS

| | | |
|---|---|---|
| 0396092 | 11/1990 | European Pat. Off. |
| 2312666 | 9/1974 | Germany |
| 785256 | 10/1957 | United Kingdom |
| 1134751 | 11/1968 | United Kingdom |
| 2116572 | 9/1983 | United Kingdom |
| WO9212196 | 7/1992 | WIPO |

OTHER PUBLICATIONS

Encyclopedia of Polymer Science; vol. 13, 1988; John Wiley Sons, p. 255.
"Dynamic Mixer With Metered Dry Filler Feed Capability", D. Ramazzotti, 33rd Annual Polyurethane Technical/Marketing Conference, (Sep. 30–Oct. 3, 1990) (pp. 125–128).
Polyurethane Handbook; G. Oertel; 1985.

*Primary Examiner*—Rachel Gorr
*Attorney, Agent, or Firm*—Fitzpatrick, Cella, Harper & Scinto

[57] ABSTRACT

A foamed isocyanate-based polymer containing a filler material, the filler material being present at a level greater than 30% by weight of the polymer and having a specific gravity of less than about 2.0 with the proviso that the filler material is not melamine. A process for producing the a foamed isocyanate-based polymer is also disclosed. The process comprises the steps of: providing a first mixture comprising water, a catalyst and a substantially inert filler material, the filler material being wetted by the water and the catalyst; providing a second mixture comprising an isocyanate and an active hydrogen-containing compound; mixing the first mixture and the second mixture to provide a reaction mixture; allowing the reaction mixture to expand to produce the foamed isocyanate-based polymer.

24 Claims, No Drawings

FOAMED POLYMER AND PROCESS FOR PRODUCTION THEREOF

This application is a division of application Ser. No. 08/074,966 filed Jun. 11, 1993, allowed on Nov. 9, 1994, as U.S. Pat. No. 5,432,204, which is a continuation-in-part of prior application Ser. No. 08/007,991, now abandoned.

BACKGROUND OF THE INVENTION

1. Field of the Invention

The present invention relates to a foamed polymer and to a process for production thereof. More particularly, the present invention relates to a foamed isocyanate-based (e.g. polyurethane, polyurea, polyisocyanurate, etc.) polymer and a process for production thereof.

2. Description of the Prior Art

Isocyanate-based polymers are known in the art. Generally, those of skill in the art understand isocyanate-based polymers to be polyurethanes, polyureas, polyisocyanurates and mixtures thereof.

It is also known in the art to produce foamed isocyanate-based polymers. Indeed, one of the advantages of isocyanate-based polymers compared to other polymer systems is that polymerization and foaming can occur in situ. This results in ability to mould the polymer while it is forming and expanding.

One of the conventional ways to produce a polyurethane foam is known as the "one-shot" technique. In this technique, the isocyanate, a suitable polyol, a catalyst, water (which acts as a reactive blowing agent and can optionally be supplemented with one or more organic blowing agents) and other additives are mixed together at once using, for example, an impingement mixer. Generally, if one were to produce a polyurea, the polyol would be replaced with a suitable polyamine. A polyisocyanurate may result from cyclotrimerization of the isocyanate component. Urethane modified polyureas or polyisocyanurates are known in the art. In either scenario, the reactants would be intimately mixed very quickly using a suitable mixer.

Another technique for producing foamed isocyanate-based polymers is known as the "prepolymer" technique. In this technique, a prepolymer of polyol and isocyanate (in the case of a polyurethane) are reacted in an inert atmosphere to form a liquid polymer terminated with isocyanate groups. To produce the foamed polymer, the prepolymer is thoroughly mixed with a lower molecular weight polyol (in the case of producing a polyurethane) or a polyamine (in the case of producing a polyurea) in the presence of a curing agent.

Regardless of the technique used, it is known in the art to include a filler material in the reaction mixture. Conventionally, filler materials have been introduced into foamed polymers by loading the filler material into one or both of the liquid isocyanate and the liquid active hydrogen-containing compound (i.e. the polyol in the case of polyurethane, the polyamine in the case of polyurea, etc.).

The nature and relative amounts of filler materials used in the reaction mixture can vary, to a certain extent, depending on the desired physical properties of the foamed polymer product, and limitations imposed by mixing techniques, the stability of the system and equipment imposed limitations (e.g. due to the particle size of the filler material being incompatible with narrow passages, orifices and the like of the equipment).

Typically, when it is desired to load the foamed polymer with a filler material, there are limitations on the process resulting from the increase in the viscosity of the reaction mixture as polymerization and foaming proceed. Additional limitations result from the difficulties encountered in achieving substantially complete wetting-out of filler materials in the case where all ingredients of the reaction mixture (including the filler material) are mixed in one step in a suitable mix head (i.e. the "one-shot" techniques).

A particular difficulty is encountered in the situation where the nature and surface structure of the filler material renders it selectively compatible with some but not all of the ingredients in the reaction mixture. The result of this is that, regardless of whether adequate mixing of ingredients is achieved, there is an imbalance in the physical allocation of the filler material in the foamed polymer product with the filler material essentially agglomerating. This results in non-uniform physical properties in the foamed product. A secondary effect is the relative (and localized) withdrawal of one or more components of the homogeneous, liquid reactant system which may cause catastrophic foam property alterations.

When a filler material is added to any reaction mixture used to produce a foamed isocyanate-based polymer, it is desirable during the process to achieve both (i) uniform distribution of the filler material throughout the polymer matrix, and (ii) intimate contact (both chemical and physical) between the filler material and the isocyanate and active hydrogen-containing compound. The reason for this is that the desired product is a polymer which is cellular in nature and the cells should not be significantly disrupted by the presence of the filler material. The result of not achieving both (i) and (ii) above can cause uncontrolled physical property variations in the resulting foamed product due to an uneven distribution of the filler material. This is particularly a problem in the case when the individual particles of filler material are not separated from each other and the resulting foamed product contains lumps of either "dry" or "wetted" and agglomerated filler material particles.

Attempts have been made to overcome these problems by addition of the filler material to the reaction mixture in specially designed low pressure mixing heads. These mixing heads essentially endeavor to achieve both (i) and (ii) in a single step. While these mixing heads provide for adequate mixing of the filler material and the reaction mixture, it is not typically possible to obtain high loadings of filler material due to the fact that the mixing heads do not provide uniform distribution of the filler material simultaneously with the required intimate mixing (at the molecular level) of the main chemical reactants. The reason for this is that as the polycondensation reaction proceeds, the viscosity of the reaction mixture increases resulting in a reduction in the ability to achieve (i) and (ii) above. Practically, this translates into an inability to achieve filler loading levels of greater than about 17–30% by weight of the polymer reaction mixture without adversely affecting the physical properties of the final foamed polymer product. Furthermore, if the efficiency of mixing the reactants and filler material is insufficient, a separation effect of the filler material (by particle size) is likely to occur resulting in an uneven particle size in the cross-section of the foam mass.

In light of these difficulties in the prior art, it would be advantageous to have a process for producing a foamed isocyanate-based polymer which is relatively simple, can utilize a large variety of filler materials and allows for the introduction of substantially large amounts of filler materials without the need for specialized mixing equipment (e.g. low pressure mixing heads). It would be especially advantageous if such a process (i) could be adapted to utilize filler materials based on recycled isocyanate-based foams or elastomers or other post-consumer and post-user products (e.g. tires), and (ii) was not limited by the particle size of the filler material.

SUMMARY OF THE INVENTION

It is an object of the present invention to provide a novel foamed isocyanate-based polymer.

It is another object of the present invention to provide a novel process which obviates or mitigates one or more of the above-identified deficiencies of the prior art.

It is another object of the present invention to provide a process which allows for production of an isocyanate-based foamed polymer having a substantially high level of filler material incorporated therein.

Accordingly, in one of its aspects, the present invention provides a foamed isocyanate-based polymer containing a filler material, the filler material being present at a level greater than about 30% by weight of the polymer and having a specific gravity of less than about 2.0 with the proviso that the filler material is not melamine.

In another of its aspects, the present invention provides a process for producing a foamed isocyanate-based polymer comprising the steps of:

providing a first mixture comprising water, a catalyst and a filler material, the filler material acting as a carrier for the water and the catalyst;

providing a second mixture comprising an isocyanate and an active hydrogen-containing compound;

mixing the first mixture and the second mixture to provide a reaction mixture;

allowing the reaction mixture to expand to produce the foamed isocyanate-based polymer.

As used throughout this specification, the term "isocyanate-based polymer" is intended to mean, inter alia, polyurethane, polyurea and polyisocyanurate.

It has been surprisingly and unexpectedly discovered that by providing a mixture comprising water, a catalyst and the filler material, the filler material will act as a carrier, i.e. as an adsorbent, for the catalyst and the water thereby enabling the entire mixture to retain its free flowing nature.

It has been further surprisingly and unexpectedly discovered that when the filler material is pretreated in this manner with the catalyst and water, and thereafter contacted and mixed with a separate mixture comprising an isocyanate and an active hydrogen-containing compound, a foamed isocyanate-based polymer may be produced having a substantially uniform distribution of the filler material therein while maintaining a desirable balance of physical properties, even at relatively high levels of filler material.

An aspect of this invention relates to a novel foamed isocyanate-based polymer which has an unusually high level of filler material having a relatively low specific gravity with the proviso that the filler material is not melamine. Filler material loading from about 30% to levels as high as 70% by weight based on the weight of the final foamed polymer are contemplated. Preferably, the loading of the filler material is in the range of from about 30% to 60% by weight, more preferably from about 30% to about 50% by weight, most preferably from about 30 to about 45% by weight. The specific gravity of the filler material for producing the polymer in accordance with the present invention is in the range of less than about 2.0, preferably in the range of from about 0.02 to about 1.5. Non-limiting examples of suitable such filler materials include: ground polymer (filled or unfilled), Found sheet molding compound, ground reinforced reaction injection molded (RRIM) elastomer, ground whole tire or a portion thereof and ground isocyante-based polymer foam (foam powder).

DETAILED DESCRIPTION OF THE PREFERRED EMBODIMENTS

The present invention is related to foamed isocyanate-based polymer and to a process for production thereof. Preferably, the isocyanate-based polymer is selected from the group comprising polyurethane, polyurea, polyisocyanurate, urea-modified polyurethane, urethane-modified polyurea, urethane-modified polyisocyanurate and urea-modified polyisocyanurate. As is known in the art, the term "modified", when used in conjunction with a polyurethane, polyurea or polyisocyanurate means that up to 50% of the polymer backbone forming linkages have been substituted.

The initial steps in the present process comprise the provision of a first mixture and a second mixture.

The first mixture comprises water, a catalyst and a filler material.

As is known in the art water can be used as a reactive blowing agent in the production of foamed isocyanate-based polymers. Specifically, water reacts with the isocyanate forming carbon dioxide which acts as the effective blowing agent in the final foamed polymer product. Optionally, organic blowing agents may be used in conjunction with water although the use of such blowing agents is generally being curtailed for environmental considerations.

The catalyst used in the first mixture is a compound capable of catalyzing the polymerization reaction. Such catalysts are known, and the choice and concentration thereof is within the purview of a person skilled in the art. See for example U.S. Pat. Nos. 4,296,213 and 4,518,778, the contents of each of which is incorporated herein by reference. Non-limiting examples of suitable catalysts include tertiary amines and/or organometallic compounds. Additionally, as is known in the art, when the objective is to produce an isocyanurate, a Lewis acid must be used as the catalyst, either alone or in conjunction with other catalysts. Of course it will be understood by those skilled in the art that a combination of two or more catalysts may be suitably used.

The choice of filler material for use in the present process is not particularly restricted provided that the filler material (directly or indirectly) does not substantially poison the polycondensation reaction. Non-limiting examples of filler material include minerals, ores, synthetic materials (both organic and polymeric), and the like. The process is particularly well suited for use with filler material selected from the group comprising post-consumer and post-user articles—in this scenario these articles may be effectively recycled using the present process. Non-limiting examples of such articles include plastics, tires, and isocyanate-based foams and elastomers (filled and untilled). Typically the filler material will be used in a particulate, flake or ground form and will have a suitable shape (e.g. microspherical, etc.). The choice of filler material may be dictated by the desired properties of or intended application for the foamed product; for example, as follows:

| Filler Material | Application/Property Conferred To Foam |
|---|---|
| 1. Fibrous | Porous, breathability, tear, special effects |
| 2. Microspheres | Flotation |
| 3. Expandable beads | Flotation |
| 4. Metallized fibres/powders | Conductivity |
| 5. Carbon black coated flakes/powders | Conductivity |
| 6. Microwave sensitive powders | Thermoformability |
| 7. Metallic fillers | Conductivity |
| 8. Heavy fillers | Sound attenuation |
| 9. Organic salts | Mould releasing |
| 10. Thermosensitive fillers | Thermoformability |

The second mixture comprises an isocyanate and an active hydrogen-containing compound.

The isocyanate suitable for use in the first mixture is not particularly restricted and the choice thereof is within the purview of a person skilled in the art. Generally, the isocyanate compound suitable for use may be represented by the general formula:

$$Q(NCO)_i$$

wherein i is an integer of two or more and Q is an organic radical having the valence of i. Q may be a substituted or unsubstituted hydrocarbon group (e.g. an alkylene or arylene group). Moreover, Q may be represented by the general formula:

$$Q^1-Z-Q^1$$

wherein $Q^1$ is an alkylene or arylene group and Z is chosen from the group comprising —O—, —O—$Q^1$—, —CO—, —S—, —S—$Q^1$—S— and —SO$_2$—. Examples of isocyanate compounds which fall within the scope of this definition include hexamethylene diisocyanate, 1,8-diisocyanato-p-methane, xylyl diisocyanate, (OCNCH$_2$CH$_2$CH$_2$OCH$_2$O)$_2$, 1-methyl-2,4-diisocyanatocyclohexane, phenylene diisocyanates, tolylene diisocyanates, chlorophenylene diisocyanates, diphenylmethane-4,4'-diisocyanate, naphthalene-1,5-diisocyanate, triphenylmethane-4,4', 4"-triisocyanate and isopropylbenzene-alpha-4-diisocyanate.

In another embodiment, Q may also represent a polyurethane radical having a valence of i. In this case Q(NCO)$_i$ is a compound which is commonly referred to in the art as a prepolymer. Generally, a prepolymer may be prepared by reacting a stoichiometric excess of an isocyanate compound (as defined hereinabove) with an active hydrogen-containing compound (as defined hereinafter), preferably the polyhydroxyl-containing materials or polyols described below. In this embodiment, the polyisocyanate may be, for example, used in proportions of from about 30 percent to about 200 percent stoichiometric excess with respect to the proportion of hydroxyl in the polyol. Since the process of the present invention relates to the production of polyurea foams, it will be appreciated that in this embodiment, the prepolymer would be used to prepare a polyurethane modified polyurea (i.e. not an unmodified polyurethane) foam.

In another embodiment, the isocyanate compound suitable for use in the process of the present invention may be selected from dimers and trimers of isocyanates and diisocyanates, and from polymeric diisocyanates having the general formula:

$$[Q''(NCO)_i]_j$$

wherein both i and j are integers having a value of 2 or more, and Q'' is a polyfunctional organic radical, and/or, as additional components in the reaction mixture, compounds having the general formula:

$$L(NCO)_i$$

wherein i is an integer having a value of 1 or more and L is a monofunctional or polyfunctional atom or radical. Examples of isocyanate compounds which fall with the scope of this definition include ethylphosphonic diisocyanate, phenylphosphonic diisocyanate, compounds which contain a =Si—NCO group, isocyanate compounds derived from sulphonamides (QSO$_2$NCO), cyanic acid and thiocyanic acid.

See also for example, British patent No. 1,453,258, the contents of which are incorporated herein by reference.

Non-limiting examples of suitable isocyanates include: 1,6-hexamethylene diisocyanate, 1,4-butylene diisocyanate, furfurylidene diisocyanate, 2,4-toluene diisocyanate, 2,6-toluene diisocyanate, 2,4'-diphenylmethane diisocyanate, 4,4'-diphenylmethane diisocyanate, 4,4'-diphenylpropane diisocyanate, 4,4'-diphenyl-3,3'-dimethyl methane diisocyanate, 1,5-naphthalene diisocyanate, 1-methyl-2,4-diisocyanate-5-chlorobenzene, 2,4-diisocyanate-s-triazine, 1-methyl-2,4-diisocyanato cyclohexane, p-phenylene diisocyanate, m-phenylene diisocyanate, 1,4-naphthalene diisocyanate, dianisidine diisocyanate, bitolylene diisocyanate, 1,4-xylylene diisocyanate, 1,3-xylylene diisocyanate, bis-(4-isocyanatophenyl)methane, bis-(3-methyl-4-isocyanatophenyl)methane, polymethylene polyphenyl polyisocyanates and mixtures thereof. A more preferred isocyanate is selected from the group comprising 2,4-toluene diisocyanate, 2,6-toluene diisocyanate and mixtures thereof, for example, a mixture comprising from about 75 to about 85 percent by weight 2,4-toluene diisocyanate and from about 15 to about 25 percent by weight 2,6-toluene diisocyanate. Another more preferred isocyanate is selected from the group comprising 2,4'-diphenylmethane diisocyanate, 4,4'-diphenylmethane diisocyanate and mixtures thereof. The most preferred isocyanate is a mixture comprising from about 15 to about 25 percent by weight 2,4'-diphenylmethane diisocyanate and from about 75 to about 85 percent by weight 4,4'-diphenylmethane diisocyanate. An example of such an isocyanate is commercially available from Imperial Chemical Industries under the tradename Rubinate M and from The Dow Chemical Company under the tradename PAPI 4027.

If the process is utilized to produce a polyurethane foam, the active hydrogen-containing compound is typically a polyol. The choice of polyol is not particularly restricted and is within the purview of a person skilled in the art. For example, the polyol may be a hydroxyl-terminated backbone of a member selected from the group comprising polyether, polyester, polycarbonate, polydiene and polycaprolactone. Preferably, the polyol is selected from the group comprising hydroxyl-terminated polyhydrocarbons, hydroxyl-terminated polyformals, fatty acid triglycerides, hydroxyl-terminated polyesters, hydroxymethyl-terminated polyesters, hydroxymethyl-terminated perfluoromethylenes, polyalkyleneether glycols, polyalkylenearyleneether glycols and polyalkyleneether triols. More preferred polyols are selected from the group comprising adipic acid-ethylene glycol polyester, poly(butylene glycol), poly(propylene glycol) and hydroxyl-terminated polybutadiene—see, for example, British patent No. 1,482,213, the contents of which are incorporated herein by reference. The most preferred polyol is a polyether polyol. Preferably, such a polyether polyol has a molecular weight in the range of from about 200 to about 10,000, more preferably from about 2,000 to about 7,000, most preferably from about 2,000 to about 6,000.

If the process is utilized to produce a polyurea foam, the active hydrogen-containing compound comprises compounds wherein hydrogen is bonded to nitrogen. Preferably such compounds are selected from the group comprising polyamines, polyamides, polyimines and polyolamines, more preferably polyamines. Non-limiting examples of such compounds include primary and secondary amine terminated polyethers. Preferably such polyethers have a molecular weight of greater than about 1500, a functionality of from 2 to 6, and an amine equivalent weight of from about 200 to about 6000. Such amine terminated polyethers are typically made from an appropriate initiator to which a lower alkylene (e.g. ethylene, propylene, butylene and mixtures thereof) oxide is added with the resulting hydroxyl terminated polyol being subsequently aminated. If two or more alkylene oxides are used, they may be present either as random mixtures or as blocks of one or the other polyether. For ease of amination, it is especially preferred that the hydroxyl groups of the polyol be essentially all secondary hydroxyl groups. Typically, the amination step replaces the majority but not all of the hydroxyl groups of the polyol.

It is known in the art that the amount of water used as a blowing agent in the preparation of a foamed isocyanate-based polymer is conventionally in the range of from about 0.5 to as high as about 40 or more parts by weight, preferably from about 1.0 to about 10 parts by weight, based on 100 parts by weight of the total active hydrogen-containing compound content in the reaction mixture. Since the amount of water used in the production of a foamed isocyanate-based polymer is limited by the fixed properties expected in the foamed polymer and by the tolerance of the expanding foam towards self structure formation, It may be necessary, in certain circumstances, to utilize a substantially inert liquid extender when high loadings of filler material are contemplated. Non-limiting examples of suitable liquid extenders include halogenated hydrocarbons, high molecular weight hydrocarbons and polyols.

It is a key aspect of the present process that, in the first mixture, the filler material acts as a carrier for the catalyst (and any other additives present) and the water so that the key components for polymerization (catalyst) and foaming (water) substantially surround the filler material. Specifically, it has been discovered that the use of the filler material as the carrier in this manner results in the ability to separate the prior art single step requirement for both (i) high mechanical mixing efficiency of the filler material with the conventional components; and (ii) the need to obtain intimate mixing (i.e. at the molecular level) of all components prior to completion of polymerization and foaming. In the present process, the filler material is initially mixed with all components in the polymerization system except the isocyanate and the active hydrogen-containing compound—i.e this is the first mixture in the present process—such that the filler material is surrounded essentially by water, catalyst and any other additives present. The preparation of the first mixture does not require mixing equipment which is specially adapted to achieve in a single step (i) and (ii) above since polymerization/foaming is not occurring. Thereafter the first mixture is contacted with the isocyanate and the active hydrogen-containing compound—i.e. this is the second mixture in the present process—thereby initiating polymerization and foaming of the combined mixtures. The result is a process which has a wide processing latitude and is quite versatile. The ability to use a second mixture having a relatively low viscosity facilitates mixing therewith large amounts of filler material of varying nature and/or particle sizes. The increased concentration of additives on the outer surface of the individual particles maximizes the intimate and uniform (both chemical and physical) incorporation of the filler material into the polymer matrix.

It is another key aspect of the present process that the first mixture be in the form of a substantially free-flowing solid (powder or particles). The intent is to achieve mixing of the filler material with water and a catalyst while maintaining the free-flowing nature of the filler material. This minimizes or eliminates the possibility of agglomeration of filler particles or, at the opposite extreme, the occurrence of wet spots.

It is important that the second mixture comprising the isocyanate and the active hydrogen-containing compound be substantially free of any catalysts or water so that any gelling thereof is very slow and no foaming occurs. The result of this is that the second mixture is a liquid having a viscosity which is sufficiently low that it may be handled relatively easily using conventional equipment.

While not wishing to be bound by any specific theory of mode of action, it is believed that the provision of the first mixture and second mixture prior to production of the foamed isocyanate-based polymer in accordance with the present invention allows for reduction or elimination of various of the process limitations of prior art processes for introducing filler materials into isocyanate-based foams. Specifically, the major reactants in the polymerization reaction are the isocyanate and the active hydrogen-containing compound. For these reactants to react to any appreciable degree at ambient or processable temperatures and conditions, a catalyst is required. When such a catalyst is added, polymerization and foaming (if a blowing agent is present) occur together with a concurrent increase in viscosity of the reaction mixture. By provision of a first reaction mixture comprising filler material which is substantially wetted with water and a catalyst, thorough mixing of the water and catalyst which is ordinarily required to make a good quality foam necessarily achieves thorough mixing of the filler material. In other words, wetting of the filler material surfaces with catalyst and water ensures that the surface of the filler material serves as the site for polymerization and foaming of the reaction mixture. This results in a particularly strong physical bond between the filler and the nascent polymeric matrix.

Further, the fact that the filler material acts as a "carrier" for the catalyst and water results in the ability of each filler material particle to have formed around it a layer of foamed polymer and for self location of the so coated filler material within the reacting mass. This reduces the amount of mechanical agitation which must be added to the system to distribute the filler material and allows for the use of conventional mixing equipment. The result of this reduction in the amount of mechanical agitation needed is an overall lowering of the free energy in the system which minimizes the occurrence of overheating of the reaction mass and the resultant property degradation associated therewith. Furthermore, the location of the filler material at or near the Plateau border of adjacent cells is believed to improve the load bearing potential of the foamed polymer. Still further, the provision of the first mixture in the present process minimizes the occurrence of migration of fugitive components potentially associated with the filler.

As will be clearly understood by those of skill in the art, it is contemplated that conventional additives in the isocyanate-based polymer art be used in the process. Non-limiting examples of such additives include: surfactants (e.g. organo-silicone compounds available under the tradename L-540 Union Carbide), cell openers (e.g. silicone oils), extenders (e.g. halogenated paraffins commercially available as Cereclor S45), cross-linkers (e.g. low molecular weight reactive hydrogen-containing compositions), pigments/dyes, flame retardants (e.g. halogenated organo-phosphoric acid compounds), inhibitors (e.g. weak acids), nucleating agents (e.g. diazo compounds), anti-oxidants, and plasticizers/stabilizers (e.g. sulphonated aromatic compounds). The amounts of these additives conventionally used would be within the purview of a person skilled in the art.

As will be apparent to those of skill in the art, the process of the present invention is useful in the production of slab foam, molded articles (e.g. automotive seat systems), carpet underlay and the like.

Embodiments of the present invention will now be described with reference to the following Examples which should not be construed a limiting the scope of the invention. The term "pbw" used in the Examples refers to parts by weight.

In the Examples the following compounds were used:

1. DABCO-33LV, an amine polymerization catalyst commercially available from Air Products;

2. NIAX-A1, an amine polymerization catalyst commercially available from ARCO;

3. T-12, an amine polymerization catalyst commercially available from Air Products;

4. X-8154, an amine polymerization catalyst commercially available from Air Products;

5. DMDEE, an amine polymerization catalyst commercially available from Texaco Corporation;

6. Diethanolamine (DEOA), a cross-linker;

7. L-540, a silicone surfactant commercially available from Union Carbide;

8. DC-5043, a silicone surfactant commercially available from Air Products;

9. DC-5169, a silicone surfactant commercially available from Air Products; 10. XFI1540, a silicone surfactant commercially available from Air Products; 11. CERECLOR S 52, an inactive extender commercially available from ICI plc; 12. VORANOL 4815, a polyol having a molecular weight of 6000 commercially available from The Dow Chemical Company; and 13. Rubinate M, a crude MDI commercially available from ICI Americas Inc.

EXAMPLES 1-5

In these Examples, the first mixture comprised: a filler material as outlined in Table 1; 4.75 pbw water; and the following catalyst system:

| Catalyst | Amount |
| --- | --- |
| DABCO-33LV | 0.6 pbw |
| NIAX-A1 | 0.2 pbw |
| T-12 | 0.05 pbw |

Further, the following additives were used in the first mixture: diethanolamine (1.7 pbw), L-540 (0.7 pbw), and CERECLOR S 52 (20 pbw).

TABLE I

| Example | Filler Material | Amount (pbw) |
| --- | --- | --- |
| 1 | Flexible PVC | 60 |
| 2 | Rigid PVC | 60 |
| 3 | ABS/PVC alloy | 60 |
| 4 | 80/20 Mixture of regrinded tires and regrinded RRIM elastomer | 100 |
| 5 | Regrinded RRIM elastomer | 85 |

In each of Examples 1-5, the first mixture was a free-flowing powder and was kept under ambient conditions for approximately 25 minutes.

The second mixture comprised 100 parts by weight of VORANOL 4815 and a sufficient amount of TDI 80/20, such that the final total isocyanate index was in the range of 0.9 to 1.1. In the second mixture, no visual change in viscosity or other signs of energetic reaction were detected for approximately 10-15 minutes after preparation under ambient temperature conditions.

While providing energetic mechanical mixing, using a high shear type disperser (3 HP at approximately 1800 r.p.m.), the second mixture was added to the first mixture and stirring was continued for approximately 30 seconds. This reaction mixture, which was a homogeneous, flowing, foaming mass, was poured in expansion bag and allowed to free rise.

After expansion, the resultant flexible polyurethane foam in each Example contained more than 30 percent by weight filler material, had a free rise density of approximately 3.2 lb/ft$^3$ and a very good visual distribution of the filler material in the cellular matrix.

EXAMPLE 6

In this Example, the first mixture comprised 85 pbw of a filler material comprising a blend of grinded tire 65 pbw) and regrinded RRIM polyurea (20) pbw, 4.5 pbw water and a catalyst system comprising

| Catalyst | Amount |
| --- | --- |
| DABCO-33LV | 0.6 pbw |
| NIAX-A1 | 0.2 pbw |
| T-12 | 0.05 pbw |

Further, the following additives were used in the first mixture: diethanolamine LF (1.7 pbw), DC-5169 (1.5 pbw), and CERECLOR S 52 (20 pbw).

The first mixture was prepared under vigorous stirring.

The second mixture comprised 20 pbw of polymer polyol (SAN type) and 80 pbw VORANOL 4815 together with a slight stoichiometric excess of TDI 80/20 (as needed for the whole system). The second blend was kept less than 1 minute at ambient temperature before carrying on with the process.

The first mixture which was in the form of a free flowing powder, was added to the second mixture under conditions of high energy stirring using a high shear mixture and the resultant foaming mass was delivered to an open mold.

Prior to conclusion of the foaming process, the mold was closed and placed in an oven at 140° F. for a period of 5 minutes. Thereafter, the mold was opened and the molded product extracted. The molded flexible polyurethane foam had a density of 49.2 kg/m$^3$ having acceptable physical properties.

EXAMPLE 7

In this Example an automotive cushion system was produced using the first and second mixtures provided in Table 2.

TABLE 2

| First Mixture | | Second Mixture | |
|---|---|---|---|
| Component | Amount (pbw) | Component | Amount |
| Regrinded RRIM elastomer | 70 | VORANOL 4815 | 90 |
| Foam powder | 10 | PIPA type polyol | 10 |
| Chemically recovered polyol | 5 | TDI 80/20 | 47.98 |
| | | Crude MDI | 19.72 |
| DEOA LF | 1.15 | | |
| DC-5043 | 2.50 | | |
| X-8154 | 1.00 | | |
| NIAX-A1 | 0.20 | | |
| VORANOL 4815 | 10.00 | | |
| $H_2O$ | 4.85 | | |

As will be evident from Table 2, the filler material in this Example was a mixture of regrinded RRIM elastomer and foam powder.

The first and second mixtures were prepared generally as described in preceding Examples 1–6. The reaction mixture was introduced into a preheated clam-shell mold. After introduction of the reaction mixture, the mold was closed and polymerization/foaming was allowed to occur. After a curing time, the molds were opened and the foamed polymer part was extracted. The resulting foamed polymer part comprised 29.9% by weight filler material and had a very good visual distribution of the filler material in the cellular matrix.

EXAMPLE 8

In this Example an automotive cushion system was produced using the first and second mixtures provided in Table 3.

TABLE 3

| First Mixture | | Second Mixture | |
|---|---|---|---|
| Component | Amount | Component | Amount |
| Regrinded tire | 100 | VORANOL 4815 | 80 |
| DEOA LF | 1.15 | PIPA type polyol | 20 |
| DC-5043 | 2.00 | TDI 80/20 | Sufficient amount |
| X-8154 | 0.50 | Modified MDI | of an 80/20 mixture of |
| DMDEE | 1.00 | | TDI/MDI to provide an |
| DABCO-33LV | 0.30 | | isocyanate index |
| NIAX-A1 | 0.20 | | in the range of 0.9 |
| T-12 | 0.04 | | to 1.1 |
| VORANOL 4815 | 10.00 | | |
| $H_2O$ | 5.85 | | |

As will be evident from Table 3, the filler material in this Example was regrinded tire.

The methodology used in Example 7 was repeated in this Example

After expansion, the resultant polyurethane foam comprised 34.2% by weight filler material and had very good visual distribution of the filler material in the cellular matrix.

EXAMPLE 9

In this Example slab-type foam system was produced using the first and second mixtures provided in Table 4.

TABLE 4

| First Mixture | | Second Mixture | |
|---|---|---|---|
| Component | Amount | Component | Amount |
| Regrinded tire | 80 | VORANOL 4815 | 100 |
| Regrinded RRIM elastomer | 20 | TDI 80/20 | Sufficient amount to provide an isocyanate index in the range of 0.9 to 1.1 |
| DEOA LF | 2.30 | | |
| L-540 | 2.00 | | |
| DABCO-33LV | 1.00 | | |
| NIAX-A1 | 0.20 | | |
| T-12 | 0.04 | | |
| VORANOL 4815 | 10.00 | | |
| $H_2O$ | 5.70 | | |

As will be evident from Table 4, the filler material in this Example was a mixture of regrinded tire and regrinded RRIM elastomer.

The first mixture was prepared by charging the ingredients into a planetary type mixer and continuously agitating the ingredients. The second mixture was prepared by mixing the ingredients in a different container with a hand mixer.

The first and second mixtures were mixed together in a single container using a hand mixer. The reaction mixture was left for free expansion and cured for approximately one hour.

After expansion, the resultant polyurethane foam: (i) comprised 34.4% by weight filler material; (ii) had a free rise density of 3.51 lb/ft$^3$; and (iii) a very good visual distribution of the filler material in the cellular matrix. The free rise foam had a gel time of approximately 35 seconds.

EXAMPLE 10

In this Example an automotive cushion system was produced using the first and second mixtures provided in Table 5.

As will be evident from Table 5, the filler material in this Example was a mixture of regrinded tire and foam powder.

The methodology of Example 7 was repeated in this Example.

After expansion, the resultant polyurethane foam comprised 34.1% by weight filler material, had a very good visual distribution of the filler material in the cellular matrix and had desirable skin integrity.

TABLE 5

| First Mixture | | Second Mixture | |
|---|---|---|---|
| Component | Amount | Component | Amount |
| Regrinded tire | 90 | VORANOL 4815 | 100 |
| Foam powder | 10 | TDI 80/20 | Sufficient amount |
| DEOA LF | 1.725 | Modified MDI | of an 80/20 mixture of |
| DC-5043 | 1.80 | | TDI/MDI to provide an |
| X-8154 | 1.00 | | isocyanate index |
| NIAX-A1 | 0.20 | | in the range of 0.9 |
| DABCO-33LV | 0.50 | | to 1.1 |
| VORANOL 4815 | 10.00 | | |
| $H_2O$ | 5.775 | | |

EXAMPLE 11

In this Example an automotive cushion system was produced using the first and second mixtures provided in Table 6.

TABLE 6

| First Mixture | | Second Mixture | |
|---|---|---|---|
| Component | Amount | Component | Amount |
| Regrinded RRIM elastomer | 70 | VORANOL 4815 | 110 |
| | | TDI 80/20 | Sufficient amount |
| Foam powder | 10 | Modified MDI | of an 80/20 mixture of |
| DEOA LF | 2.30 | | TDI/MDI to provide an |
| XF11540 | 1.50 | | isocyanate index |
| X-8154 | 1.00 | | in the range of 0.9 |
| NIAX-A1 | 0.20 | | to 1.1 |
| DABCO-33LV | 0.80 | | |
| CERECLOR S 52 | 10.00 | | |
| H₂O | 5.70 | | |

As will be evident from Table 6, the filler material in this Example was a mixture of regrinded RRIM elastomer and foam powder.

The methodology of Example 7 was repeated in this Example.

After expansion, the resultant polyurethane foam 28.9 % by weight filler material and had a very good visual distribution of the filler material in the cellular matrix.

What is claimed is:

1. A polyurethane foam consisting essentially of a cellular matrix having a plurality of Plateau borders, the foam containing a non-cellular polymeric filler material at the Plateau borders, the filler material located at the Plateau borders being present at a level greater than 30% by weight of the foam and having a specific gravity of less than about 1.5.

2. The polyurethane foam defined in claim 1, wherein the filler material is produced from a ground polymer.

3. The polyurethane foam defined in claim 2, wherein the ground polymer is filled.

4. The polyurethane foam defined in claim 2, wherein the ground polymer is unfilled.

5. The polyurethane foam defined in claim 1, wherein the filler material is ground sheet molding material.

6. The polyurethane foam defined in claim 1, wherein the filler material is ground reaction injected molded elastomer.

7. The polyurethane foam defined in claim 1, wherein the filler material is ground whole tire or a portion thereof.

8. The polyurethane foam defined in claim 1, wherein the filler material is a ground isocyanate-based polymer foam.

9. The polyurethane foam defined in claim 1, wherein the filler material is regrinded reinforced reaction injection molded elastomer.

10. The polyurethane foam defined in claim 1, wherein the filler material is present in an amount in the range of from about 30% to about 70% by weight of the foam.

11. The polyurethane foam defined in claim 1, wherein the filler material is present in an amount in the range of from about 30% to about 60% by weight of the foam.

12. The polyurethane foam defined in claim 1, wherein the filler material is present in an amount in the range of from about 30% to about 50% by weight of the foam.

13. The polyurethane foam defined in claim 1, wherein the filler material is present in an amount in the range of from about 30% to about 90% by weight of the foam.

14. The polyurethane foam defined in claim 1, wherein the filler material is in particulate form and is produced from a member selected from the group consisting of plastic, foam, tire and mixtures thereof.

15. A polyurethane foam consisting essentially of a cellular matrix having a plurality of Plateau borders, the foam containing a non-cellular polymeric filler material, the filler material being present at a level greater than 30% by weight of the foam and having a specific gravity of less than about 1.5;

wherein: (i) the polymeric filler material is in particulate form and the source thereof is selected from the group consisting of plastic, foam, tire and mixtures thereof, and (ii) essentially all of the polymeric filler material is located at the Plateau borders of the cellular matrix.

16. The polyurethane foam defined in claim 15, wherein the filler material is present in an amount in the range of from about 30% to about 70% by weight of the foam.

17. The polyurethane foam defined in claim 15, wherein the filler material is present in an amount in the range of from about 30% to about 60% by weight of the foam.

18. The polyurethane foam defined in claim 15, wherein the filler material is present in an amount in the range of from about 30% to about 50% by weight of the foam.

19. The polyurethane foam defined in claim 15, wherein the filler material is present in an amount in the range of from about 30% to about 90% by weight of the foam.

20. A polyurethane foam consisting essentially of a cellular matrix having a plurality of Plateau borders, the foam containing a non-cellular polymeric filler material, the filler material being present at a level in the range of from about 30% to about 70% by weight of the polymer and having a specific gravity of less than about 1.5;

wherein: (i) the polymeric filler material is in particulate form and the source thereof is selected from the group consisting of plastic, polymer, foam, tire and mixtures thereof, and (ii) essentially all of the polymeric filler materia is located at the Plateau borders of the cellular matrix.

21. The polyurethane foam defined in claim 20, wherein the filler material is present in an amount in the range of from about 30% to about 70% by weight of the foam.

22. The polyurethane foam defined in claim 20, wherein the filler material is present in an amount in the range of from about 30% to about 60% by weight of the foam.

23. The polyurethane foam defined in claim 20, wherein the filler material is present in an amount in the range of from about 30% to about 50% by weight of the foam.

24. The polyurethane foam defined in claim 20, wherein the filler material is present in an amount in the range of from about 30% to about 90% by weight of the foam.

* * * * *